UNITED STATES PATENT OFFICE.

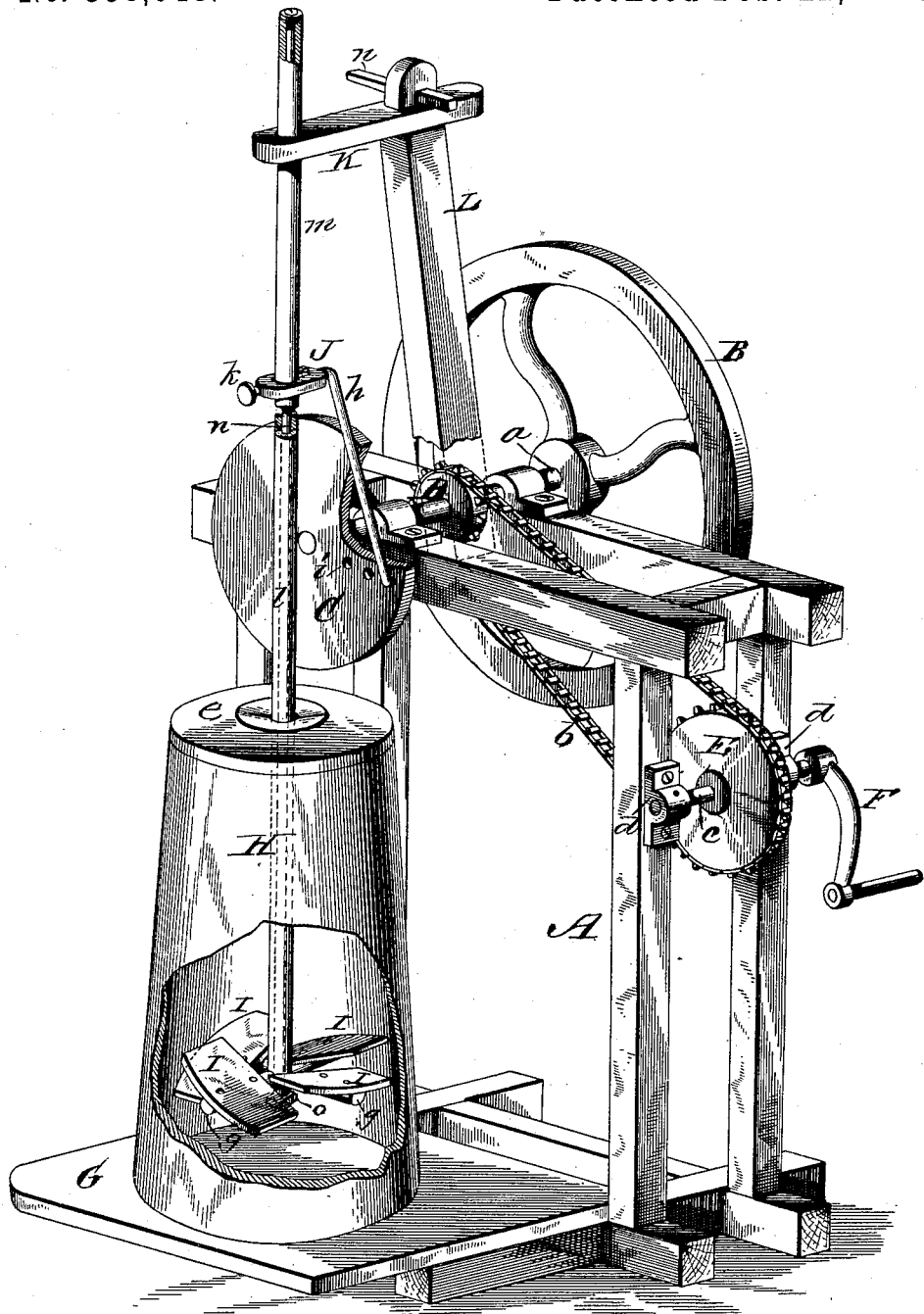

HARRIS P. MARKLEY, OF SUMMERFORD, OHIO.

CHURN.

SPECIFICATION forming part of Letters Patent No. 358,048, dated February 22, 1887.

Application filed June 1, 1886. Serial No. 203,826. (No model.)

*To all whom it may concern:*

Be it known that I, HARRIS P. MARKLEY, a citizen of the United States, residing at Summerford, in the county of Madison and State of Ohio, have invented certain new and useful Improvements in Churns; and I do hereby declare that the following is a full, clear, and exact description of the same, reference being had to the annexed drawing, making a part of this specification, and to the letters and figures of reference marked thereon.

The present invention has relation to that class of churns in which the dasher-shaft is operated by a crank-rod and disk or wheel provided with a series of holes for adjustably connecting thereto the crank-rod, by which the extent of throw or stroke of the dasher-shaft may be regulated, the crank-rod being connected to the shaft and the disk or wheel to the driving-power.

The invention further relates to that class of dasher-shafts formed of two independent sections swiveled together, whereby the lower section, carrying the dasher-blade, will have a horizontal rotary motion when the dasher-shaft is worked up and down.

Dasher-shafts for churns, from necessity, are usually made of wood, and consequently they are liable to warp or spring out of shape by becoming wet and then being dried, rendering them very frequently useless, as they have to pass through a small hole in the cover of the churn, and consequently, if they are not perfectly straight, it will be difficult to operate them further than this; moreover, they are liable to split by unequal contraction or expansion. It is therefore the object of the invention to remedy these difficulties, which I attain by providing a metal rod extending the entire length of the dasher-shaft and passing through it, which forms a brace for the shaft throughout its entire length, and providing the lower end of the rod with screw-threads to receive a confining-nut for retaining the lower section of the shaft on the rod.

The invention therefore consists in the peculiar construction of the dasher-shaft in connection with other operating parts of the churn, substantially as shown in the drawing, and hereinafter described and claimed.

In the accompanying drawing, which represents a perspective view of my invention, A designates a suitable frame, to the top of which is journaled the transverse driving-shaft $a$, provided at one end with a fly-wheel, B, and at the opposite end with a crank-disk, C. The shaft $a$ is driven by an endless sprocket-chain, $b$, engaging with sprocket-wheels D E, the former being keyed to the shaft $a$ and the latter to a short shaft, $c$, having its bearings in suitable boxes, $d$, and provided with a suitable handle, F, for turning it. The employment of the sprocket wheels and chain provides a very effective and durable means for operating the driving-shaft without the necessity of expensive gearing or the usual belts and pulleys.

The frame A is provided with a platform, G, upon which is supported the churn-cylinder H, of glass, earthenware, or any other desirable material. The cylinder H is provided with a suitable cover, $e$, through which passes the dasher-shaft, having at its lower end radial spokes $g$, to which are secured the blades I.

I do not wish to be understood to confine myself to any special form of dasher-head, as any well-known form of blades may be substituted.

The reciprocating motion is given to the dasher-shaft by means of the crank-rod $h$, one end of which is connected to one of a series of holes, $i$, in the crank-disk C, and the opposite end of the rod is connected to a suitable bracket, J, adjustable upon the shaft and held in its adjusted position by a set-screw, $k$. By means of the series of holes which are arranged on the same horizontal plane from the center of the crank-disk to its periphery the end of the crank-rod is enabled to be brought nearer to or farther from the center of the disk, whereby the throw or stroke of the dasher-shaft is regulated.

To provide for the adjustment of the crank-rod, I employ the bracket J, and provide it with the set-screw $k$, which, in connection with the line of holes $i$ in the crank-disk, enables the crank-rod to be adjusted to regulate the throw or stroke of the dasher-shaft. With reference to the peculiar construction of the dasher-shaft, which refers particularly to that class formed of two independent sections, $l\ m$, I provide a metal rod, $n$, of somewhat greater length than the shaft, and said rod extends centrally through both the shaft-sections, whereby the lower section is swiveled to the upper section. This rod is screw-threaded at its lower end, and is of sufficient length to have this screw-threaded end to project below the shaft-section $l$, and a nut, $o$, engages therewith to form a support for the lower shaft-section and hold it on the rod, and also enabling the shaft-section to be removed for cleaning the dasher-head by first unscrewing and removing the nut. This rod forms a brace throughout the entire length of the dasher-shaft, thereby greatly strengthening it, and prevents the shaft from warping, springing, or twisting out of shape or out of a true vertical line, which is considered of very great importance, especially in this class of dasher-shafts formed of wood and in sections.

As will be understood, when the dasher-shaft is given its vertical reciprocating motion by the mechanism heretofore described, the dasher-blade, when coming against the cream, will cause the lower dasher-shaft section to revolve or turn horizontally, and with it the dasher-head.

The upper shaft-section, $m$, extends loosely through a guide-arm, K, projecting horizontally from the end of a post, L, secured to the frame A, the arm being detachably connected thereto in any convenient manner, but preferably by a pin or key, $o$, as shown, thereby enabling the dasher-shaft to be disconnected by first removing the arm K.

Having now fully described my invention, what I claim as new, and desire to secure by Letters Patent, is—

In a churn, a dasher-shaft consisting of two independent sections, the lower one of which carries the dasher-head, and adapted to revolve upon its axis, and a central brace-rod extending entirely through the shaft-section and provided with screw-threads upon its lower end, and a nut for holding the dasher-head thereto, in combination with a crank-disk and a crank-rod adjustably connected thereto and to the shaft, and driving mechanism for imparting to the disk a rotary motion, substantially as and for the purpose set forth.

In testimony that I claim the above I have hereunto subscribed my name in the presence of two witnesses.

HARRIS P. MARKLEY.

Witnesses:
GEO. W. WILSON,
WM. GILMARTIN.